(12) United States Patent
Lavoie et al.

(10) Patent No.: US 9,817,785 B2
(45) Date of Patent: Nov. 14, 2017

(54) STANDARDIZED HOT-PLUGGABLE TRANSCEIVING UNIT WITH SDI SIGNAL TO IP FLOWS CONVERSION CAPABILITIES

(71) Applicant: Embrionix Design inc., Laval (CA)

(72) Inventors: Renaud Lavoie, Laval (CA); Eric Dudemaine, Crabtree (CA)

(73) Assignee: Embrionix Design Inc., Laval (CA)

( * ) Notice: Subject to any disclaimer, the term of this patent is extended or adjusted under 35 U.S.C. 154(b) by 372 days.

(21) Appl. No.: 14/682,771

(22) Filed: Apr. 9, 2015

(65) Prior Publication Data

US 2016/0299868 A1     Oct. 13, 2016

(51) Int. Cl.

| G06F 13/00 | (2006.01) |
|---|---|
| H05K 7/10 | (2006.01) |
| G06F 13/40 | (2006.01) |
| G06F 13/362 | (2006.01) |
| G06F 13/42 | (2006.01) |

(52) U.S. Cl.
CPC ........ *G06F 13/4081* (2013.01); *G06F 13/362* (2013.01); *G06F 13/4282* (2013.01)

(58) Field of Classification Search
None
See application file for complete search history.

(56) References Cited

U.S. PATENT DOCUMENTS

| 7,433,596 | B2 * | 10/2008 | Harres | H04L 5/14 |
|---|---|---|---|---|
| | | | | 398/138 |
| 7,697,566 | B2 * | 4/2010 | Keane | H04L 12/413 |
| | | | | 370/466 |
| 9,548,909 | B2 * | 1/2017 | Matsunaga | H04L 43/026 |
| 2011/0262147 | A1 * | 10/2011 | Lavoie | H04B 10/40 |
| | | | | 398/135 |
| 2015/0135209 | A1 * | 5/2015 | LaBosco | H04N 21/43635 |
| | | | | 725/31 |
| 2015/0244752 | A1 * | 8/2015 | Zhou | H04L 65/4069 |
| | | | | 709/231 |
| 2016/0037235 | A1 * | 2/2016 | Nakamura | H04N 21/23602 |
| | | | | 725/110 |
| 2016/0080274 | A1 * | 3/2016 | Meyer | H04L 47/18 |
| | | | | 370/231 |

OTHER PUBLICATIONS

Gaggioni, Hugo; "IP Networking for Studio and Outside Broadcasting Production Applications"; Presentation; Nov. 21, 2014.

* cited by examiner

*Primary Examiner* — Elias Mamo
(74) *Attorney, Agent, or Firm* — IP Delta Plus Inc.

(57) ABSTRACT

A standardized hot-pluggable transceiving unit comprising a housing, a SDI connector, and a signal conversion module. The housing is adapted to being inserted into a chassis of a hosting unit. The SDI connector receives a SDI signal comprising a video payload and at least one other payload. The signal conversion module is in the housing, and converts the SDI signal into a first IP flow for transporting the video payload and at least one other IP flow for transporting the at least one other payload. The generated IP flows are outputted from the SFP unit by one or more connectors different from the SDI connector. The other payload can be an audio or a metadata payload. In another aspect, a transceiving unit provides for combining a plurality of IP flows each comprising a different type of payload into a SDI signal.

20 Claims, 11 Drawing Sheets

STANDARDIZED HOT-PLUGGABLE TRANSCEIVING UNIT WITH SDI SIGNAL TO IP FLOWS CONVERSION CAPABILITIES

TECHNICAL FIELD

The present disclosure relates to the field of standardized hot-pluggable transceiving units. More specifically, the present disclosure relates to a standardized hot-pluggable transceiving unit with SDI signal to IP flows conversion capabilities.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at http://www.sffcommittee.com/ie/index.html.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a motherboard, a card or a backplane leading to further components, via a back interface of the SFP unit. Specification no INF-8074i Rev 1.0, entitled "SFP (Small Form-factor Pluggable) Transceiver, dated May 12, 2001, available at ftp://ftp.seagate.com.com/sff/INF-8074.PDF, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, etc.

In the field of video transport, advances have been made recently for transporting the payload of a Serial Digital Interface (SDI) signal carrying video into Internet Protocol (IP) packets. Traditional equipment, such as routers or servers, are generally used for performing the conversion of the SDI signal into a flow of IP packets. However, the entire payload of the SDI signal is merely extracted from the SDI signal and embedded in the IP packets, without taking into consideration the specific components of the SDI payload, such as a video payload, an audio payload and a metadata payload.

Therefore, there is a need for a new standardized hot-pluggable transceiving unit with SDI signal to IP flows conversion capabilities.

SUMMARY

According to a first aspect, the present disclosure provides a standardized hot-pluggable transceiving unit comprising a housing, a Serial Digital Interface (SDI) connector, and a signal conversion module. The housing has specific standardized dimensions and is adapted to being inserted into a chassis of a hosting unit. The SDI connector receives a SDI signal comprising a video payload and another payload. The signal conversion module is in the housing, and converts the SDI signal into a first Internet Protocol (IP) flow for transporting the video payload and a second IP flow for transporting the other payload.

In a particular aspect, the first and second IP flows are outputted from the transceiving unit via at least one additional connector of the transceiving unit.

According to a second aspect, the present disclosure provides a standardized hot-pluggable transceiving unit comprising a housing, a SDI connector, and a signal conversion module. The housing has specific standardized dimensions and is adapted to being inserted into a chassis of a hosting unit. The signal conversion module is in the housing, and combines a video payload transported by a first IP flow with another payload transported by a second IP flow into a SDI signal. The first and second IP flows are received by the transceiving unit. The SDI connector outputs the SDI signal.

In a particular aspect, the first and second IP flows are received via at least one additional connector of the transceiving unit.

BRIEF DESCRIPTION OF THE DRAWINGS

Embodiments of the disclosure will be described by way of example only with reference to the accompanying drawings, in which.

DETAILED DESCRIPTION

Figure 1:
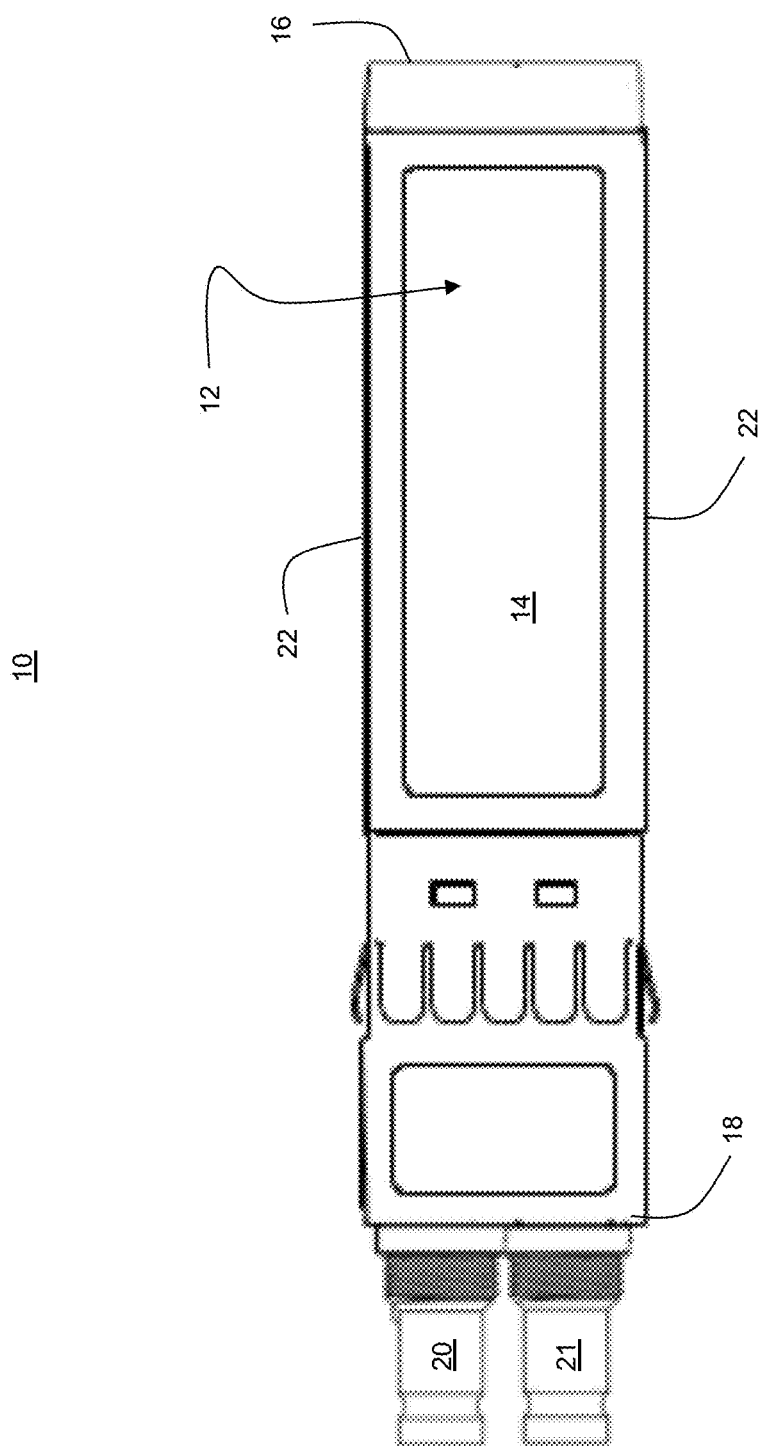
FIG. 1 is a top view of an SFP unit.
Figure 2:
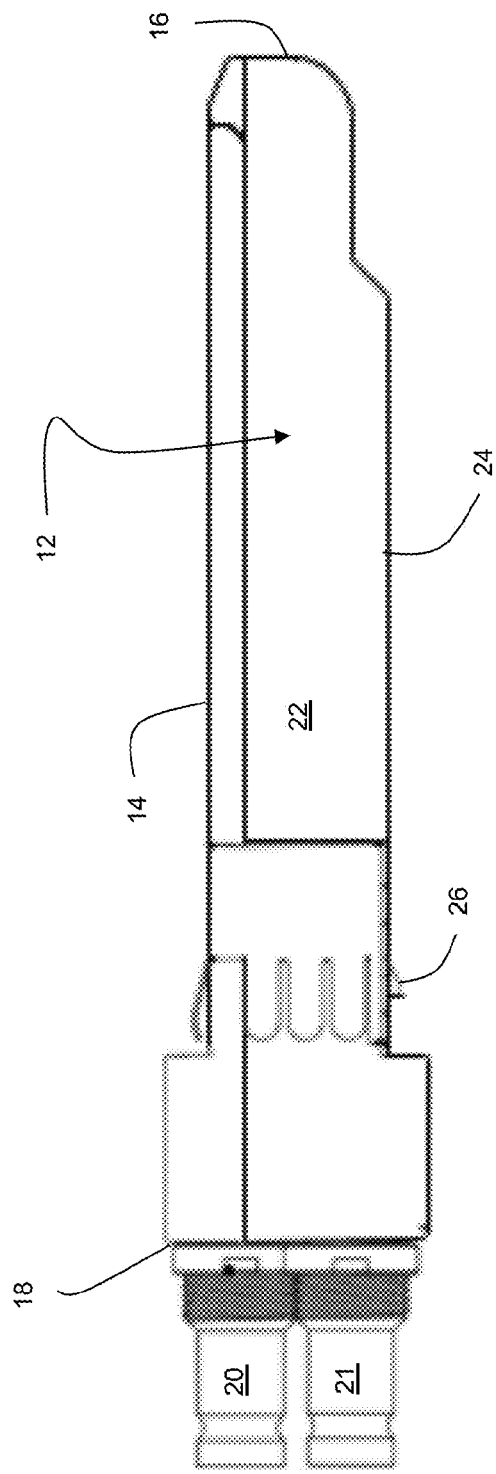
FIG. 2 is a side elevation view of the SFP unit of FIG. 1.
Figure 4:
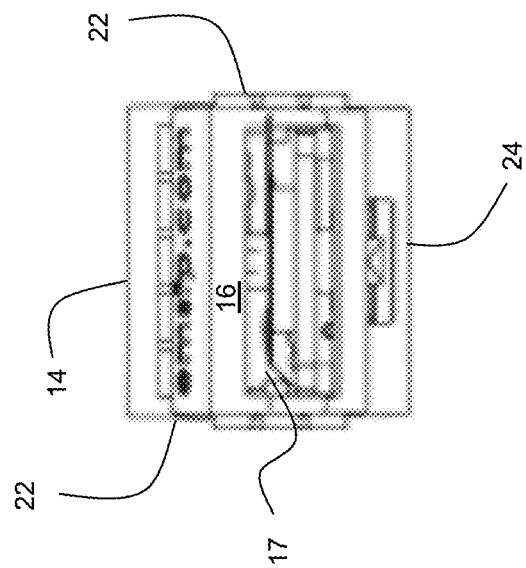
FIG. 4 is back elevation view of the SFP unit of FIG. 1.
Figure 3:
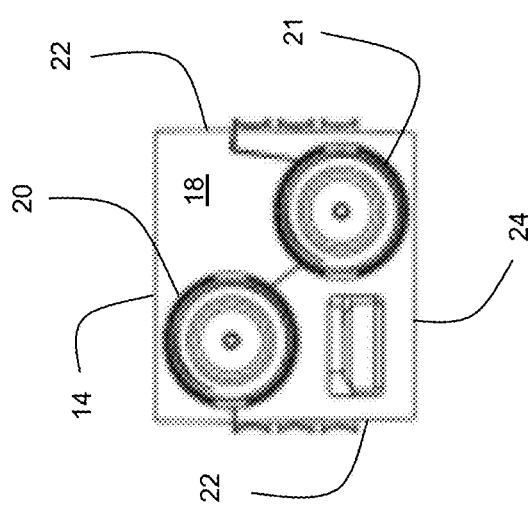
FIG. 3 is a front elevation view of the SFP unit of FIG. 1.
Figure 5:
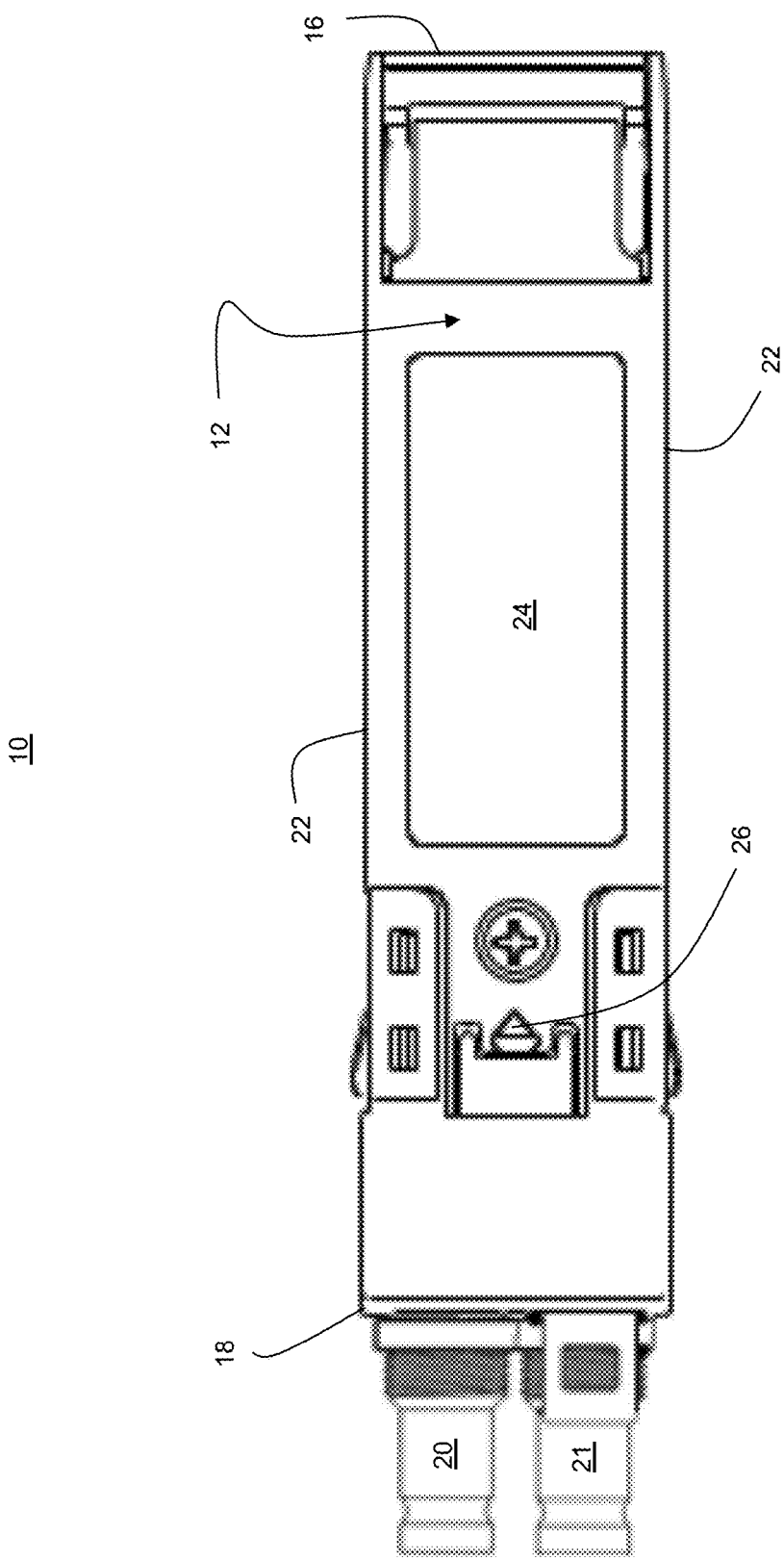
FIG. 5 is a bottom view of the SFP unit of FIG. 1.
Figure 6:
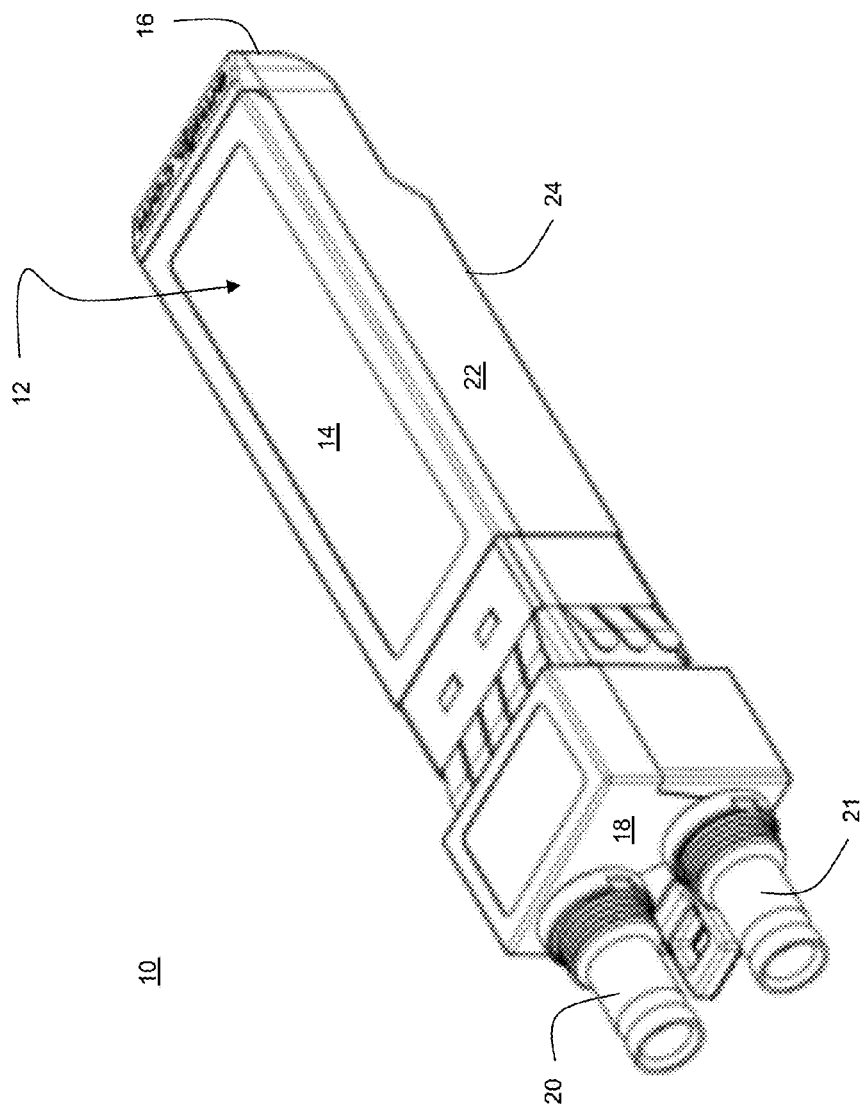
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. While conventional units merely provide connection capabilities between a hosting unit in which they are inserted and external apparatuses, the standardized hot-pluggable transceiving unit disclosed herein provides the capability to convert a SDI signal into multiple IP flows, and/or to combine multiple IP flows into a SDI signal.

The following terminology is used throughout the present disclosure:

SFP: Small Form-factor Pluggable, this term refers to units that are insertable into a chassis of a hosting unit; in the present disclosure, an SFP unit complies with an industry standard specification.

Connector: A device component for physically joining circuits carrying electrical, optical, radio-frequency, or like signals.

Video signal: Analog or digital signal usable for display purposes, either directly on a monitor, or through multicast or broadcast.

SDI: Serial Digital Interface, a family of digital video interfaces using one or more coaxial cables with Bayonet Neill-Concelman (BNC) connectors.

SMPTE: A family of digital video transmission standards published by the Society of Motion Picture and Television Engineers (SMPTE).

Signal conversion module: A hardware component, software component, or combination thereof, capable of transforming a first signal compliant with a first standard into a second signal compliant with a second standard. A payload transported by the first signal is extracted from the first signal, and embedded into the second signal for further transport by the second signal.

In the rest of the disclosure, an SFP unit is used to illustrate an example of a standardized hot-pluggable transceiving unit. However, the teachings of the present disclosure are not limited to an SFP unit, and can be applied to any type of standardized hot-pluggable transceiving unit.

The SFP unit comprises a housing having a front panel, a back panel, a top, a bottom and two sides. The front panel includes at least one connector for connecting a cable, a fiber, twisted pairs, etc. The back panel includes at least one connector for connecting to a hosting unit. The SFP unit may be fully-compliant or partially compliant with standardized SFP dimensions, such as SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK or any other standardized Small Form-factor Pluggable unit. Consequently, in the context of the present disclosure, an SFP Unit may correspond to SFP, SFP+, XFP, Xenpak, QSFP, QSFP+, CFP, CPAK, or any other known standards related to Small Form-factor Pluggable units.

In the present description, the terms "video signal" or "SDI signal" are used interchangeably, and refer more particularly to a digital video signal compliant with the SDI standard. Variants of the SDI standard include for example SD-SDI, HD-SDI, ED-SDI, 3G-SDI, 6G-SDI, 12G-SDI, etc.; which have all been standardized by the SMPTE organization. An SDI signal transports an SDI payload, which comprises a video payload carrying a video component of the SDI signal. The SDI payload generally also comprises at least one additional payload, such as an audio payload for carrying an audio component of the SDI signal and/or a metadata payload for carrying a metadata component of the SDI signal.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing defines a top 14, a bottom 24, and two sides 22. The housing 12 may be at least partially of dimensions in compliance with at least one of the following standards: SFP, SFP+, XFP, Xenpak, QSFP, QSFP+, CFP, CPAK, etc. Alternatively, the housing 12 has functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 may comprise a rear interface 17, for instance an electrical or an optical interface. In an example, the back panel comprises the rear interface 17 (also named a host connector) suitable to connect the SFP unit 10 to a backplane of a chassis (not shown for clarity purposes), as known to those skilled in the art.

The SFP unit 10 further comprises a front panel 18 affixed to the housing 12. The front panel 18 may comprise one or more connectors, for example a connector 20 of a co-axial cable type such as SDI, adapted to send and/or receive a digital video signal and a connector 21, also of the co-axial cable type, adapted to send and/or receive a digital data signal. The SFP unit 10 may further comprise an engagement mechanism, such as for example a latch 26 as shown in a resting position on the bottom 24 in FIG. 2, for maintaining the SFP unit 10 in place within a chassis.

Referring now concurrently to FIGS. 7A, 7B, 7C and 7D, an exemplary block diagram of an SFP unit 100 having SDI signal to IP flows conversion capabilities is illustrated. The SFP unit 100 corresponds to the SFP unit 10 represented in FIGS. 1-6, and has been adapted to provide the signal conversion capabilities. Additional components of the SFP unit 100, such as a signal conversion module 102, are internal to its housing 12. The housing 12 has specific standardized dimensions and is adapted to being inserted into a chassis of a hosting unit (not represented in the Figures).

The SFP unit 100 comprises an SDI connector 20 on the front panel 18 of the SFP unit 100 for receiving an SDI signal. The SDI signal has a payload comprising a video payload and at least one other payload. For example, the SDI signal has a video payload (e.g. a video program) and an audio payload (e.g. a soundtrack accompanying the video program). Alternatively, the SDI signal has a video payload and a metadata payload (e.g. subtitles accompanying the video program). In still another alternative, the SDI signal has a video payload, an audio payload and a metadata payload. The video data (video payload) are transported serially line-by-line, frame-by-frame. Each frame has vertical ancillary data (VANC) where no video data is transmitted, and each line also contains horizontal ancillary data (HANG) where no video data is transmitted. The VANC and HANG data contain the audio data (audio payload) and/or the metadata (metadata payload) accompanying the video data.

The metadata payload may include a variety of types of data, such as closed caption text, subtitle text, rating text, a time code (e.g. for indicating a time interval before a program goes live), a Vertical Blanking Interval (VBI), V-chip rating, etc. Several of these types of data can be included simultaneously in the metadata payload. The metadata transported by the metadata IP flow may be in the Material eXchange Format (MXF), which has been standardized by the SMPTE organization.

The signal conversion module 102 converts the SDI signal received by the SDI connector 20 into a first IP flow for transporting the video payload of the SDI signal and at least one other IP flow for transporting another payload of the SDI signal. The generated IP flows are outputted from the SFP unit 100 by one or more connectors different from the SDI connector 20. More particularly, the signal conversion module 102 extracts from the SDI signal received by the SDI connector 20 the video payload and generates therefor the first IP flow, and also extracts the another payload (for example audio, subtitles, time codes, a subset thereof, etc.) and generates therefor the at least one other IP flow.

Figure 7A:
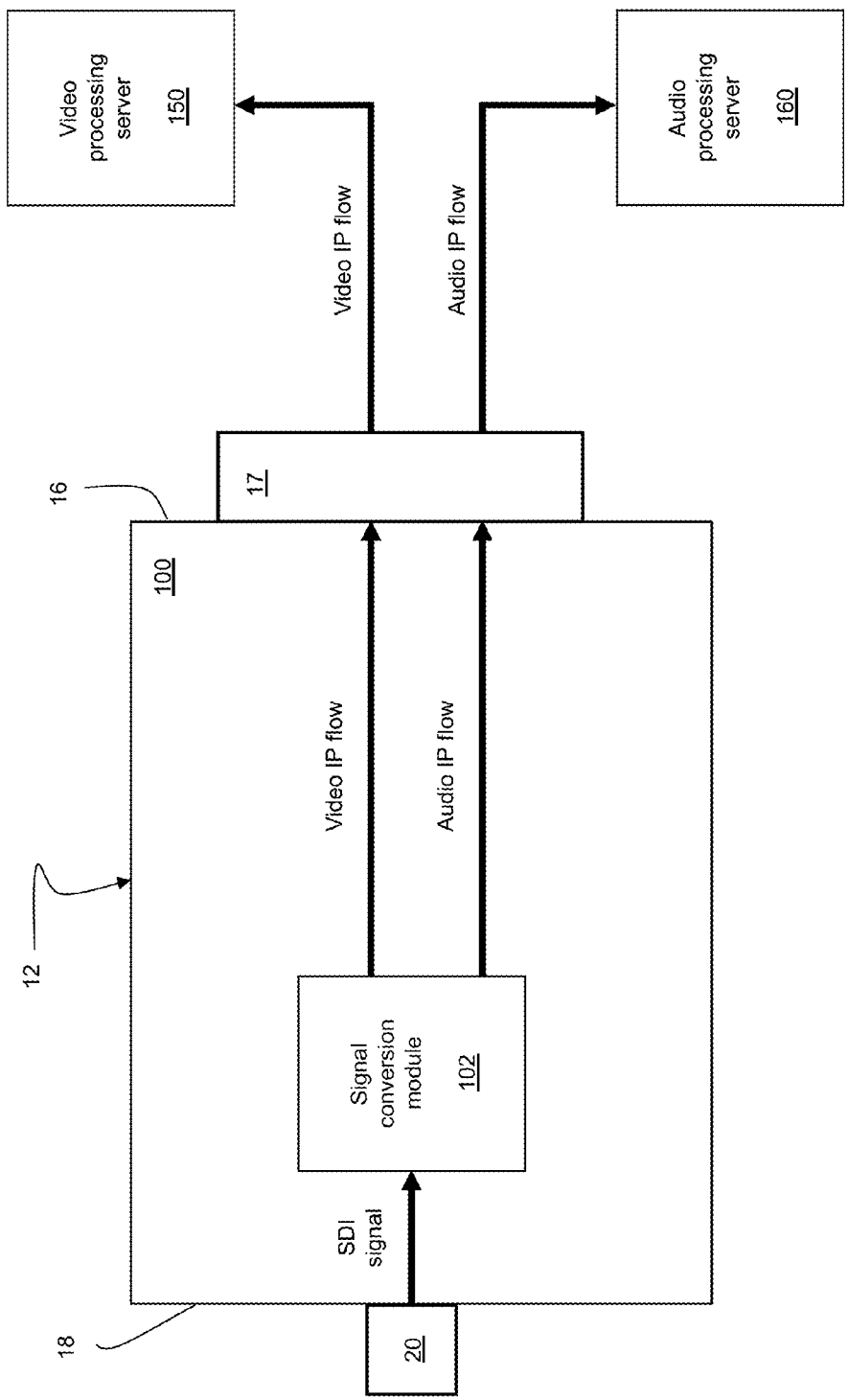
FIGS. 7A to 7D represent a simplified exemplary block diagram of various embodiments of an SFP unit having a signal conversion module for converting an SDI signal into IP flows.
Figure 7B:
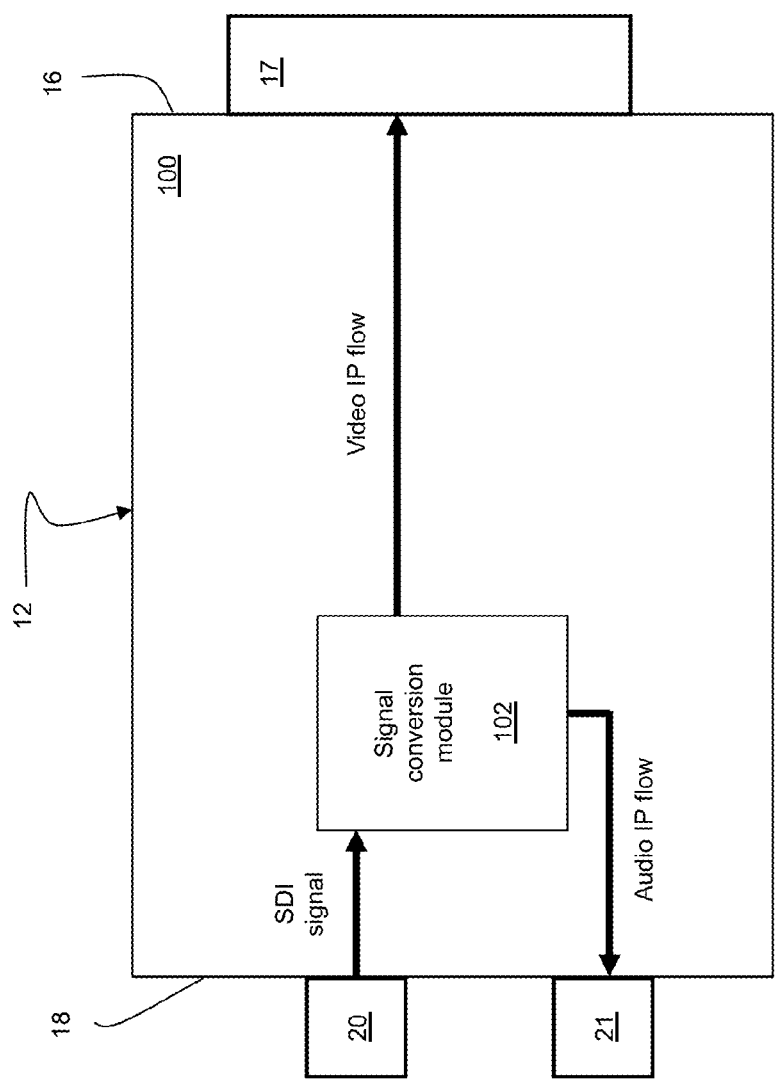

FIGS. 7A and 7B illustrate the SDI signal comprising a video payload and an audio payload. The signal conversion module 102 converts the SDI signal into a video IP flow for transporting the video payload and an audio IP flow for transporting the audio payload.

Although not represented in the Figures, the SDI signal may also comprise a video payload and a metadata payload. The signal conversion module 102 converts the SDI signal into a video IP flow for transporting the video payload and a metadata IP flow for transporting the metadata payload.

Figure 7C:
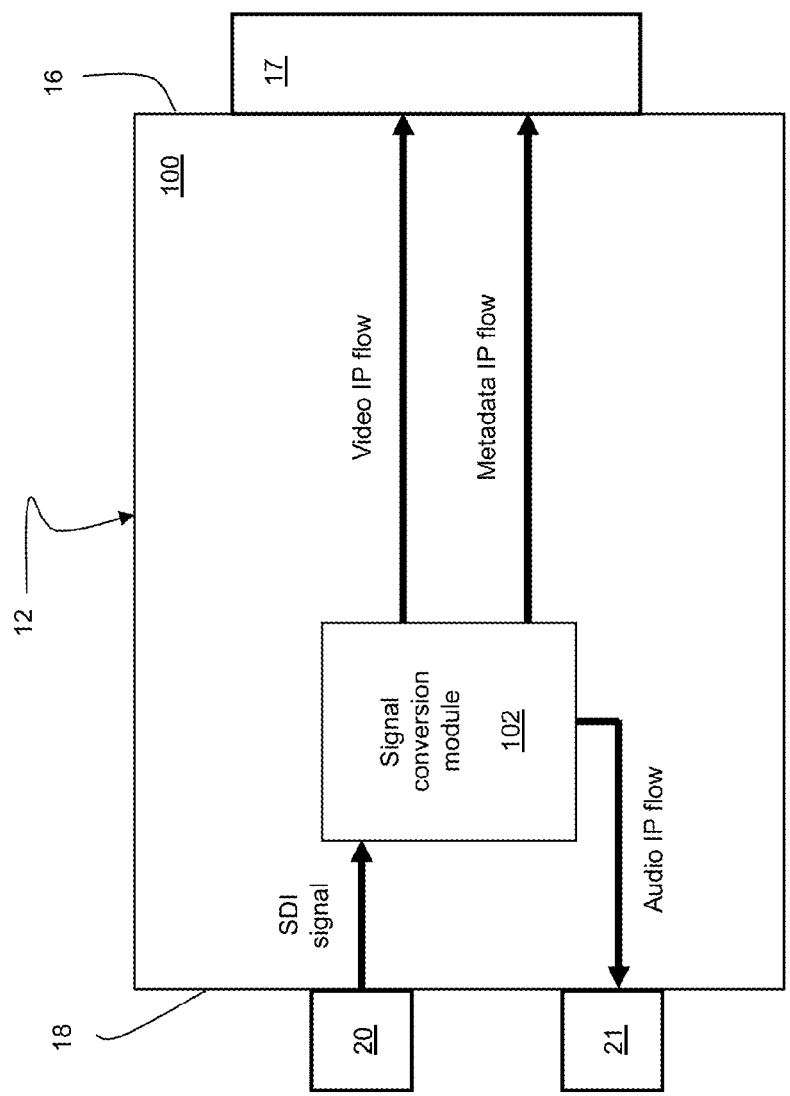

FIG. 7C illustrates the SDI signal comprising a video payload, an audio payload, and a metadata payload. The signal conversion module 102 converts the SDI signal into a video IP flow for transporting the video payload, an audio IP flow for transporting the audio payload, and a metadata IP flow for transporting the metadata payload.

An IP flow is well known in the art. It consists in a sequence of IP packets from a source (the SFP unit 100) to a destination (e.g. server 150 or server 160 represented in FIG. 7A). Several protocol layers are involved in the transport of the IP packets of an IP flow generated by the signal conversion module 102, including a link layer (e.g. Media Access Control (MAC) for Ethernet), an Internet layer (e.g. IPv4 or IPv6), a transport layer (e.g. User Datagram Protocol (UDP)), and one or more application layers ultimately embedding one of: a video payload, an audio payload and a metadata payload. The IP flow provides delivery of the applicative payload (video, audio or metadata) from the SFP unit 100 to its destination over an IP networking infrastructure.

The IP flows generated by the signal conversion module 102 may all be outputted by a same connector of the SFP unit 100. For example, FIG. 7A illustrates the generated video IP flow and audio IP flow outputted by the rear interface 17 on the back panel 16 of the SFP unit 100. Although not illustrated in the Figures, the generated IP flows can also all be outputted by a second connector on the front panel 18 of the SFP unit 100 (e.g. connector 21 represented in FIG. 2).

Alternatively, the IP flows generated by the signal conversion module 102 are outputted by different connectors of the SFP unit 100. For example, FIG. 7B illustrates the generated video IP flow outputted by the rear interface 17 on the back panel 16, and the generated audio IP flow outputted by the connector 21 on the front panel 18. Similarly, FIG. 7C illustrates the generated video IP flow and metadata IP flow outputted by the rear interface 17 on the back panel 16, and the generated audio IP flow outputted by the connector 21 on the front panel 18.

The connector 21 for outputting the IP flow(s) may consist of an electrical or optical connector, adapted for outputting a signal transporting the IP flow(s) to respectively an electrical or optical cable connected to the SFP unit 100 via the connector 21. The signal transporting the IP flow(s) has a physical layer adapted for the transport of IP packets, such as Ethernet, Synchronous Optical Networking (SONET)/Synchronous Digital Hierarchy (SDH), etc.

The IP flows outputted by the SFP unit 100 can be transported to different servers for further processing, via an IP network infrastructure not represented in the Figures. The IP network infrastructure may consist of an Intranet, an Extranet, a Local Area Network (LAN), a Wide Area Network (WAN), the Internet at large, etc. For example, in FIG. 7A, the IP flow transporting the video payload is transmitted to a video processing server 150 dedicated to the processing of the video payload, and the IP flow transporting the audio payload is transmitted to an audio processing server 160 dedicated to the processing of the audio payload. Similarly, in FIG. 7C, the IP flow transporting the metadata payload can be transmitted to a metadata processing server (not represented in FIG. 7C) dedicated to the processing of the metadata payload. After processing by the dedicated servers, the IP flows may be recombined into a SDI signal by a signal conversion module of a SFP unit, as will be detailed later in the description in relation to FIG. 8.

In a particular aspect, at least one of the IP flows (generated by the signal conversion module 102 (e.g. video IP flow) and outputted by a connector (e.g. 17 or 21) of the SFP unit 100) conforms to one of the following standards: the SMPTE 2022-5 standard, the SMPTE 2022-6 standard, and the SMPTE 2022-7 standard. These three standards can be used singly or in combination.

The SMPTE 2022-5 standard provides a Forward Error Correction (FEC) scheme for compensating potential IP packet losses of an IP flow transporting an SDI payload, since IP networks do not provide a guaranteed delivery of all transmitted IP packets.

The SMPTE 2022-6 standard provides transport of SDI payloads via the Real-time Transport Protocol (RTP). It also provides an additional protocol layer on top of the RTP layer: the High-Bitrate Media Transport Protocol (HBRMT) protocol layer, which supports a high-precision clock and extra metadata.

The SMPTE 2022-7 standard provides seamless protection switching to an IP flow transporting an SDI payload, by sending two matching streams of IP packets from a source to a destination over different paths, and have the receiver switch automatically between them.

Figure 7D:
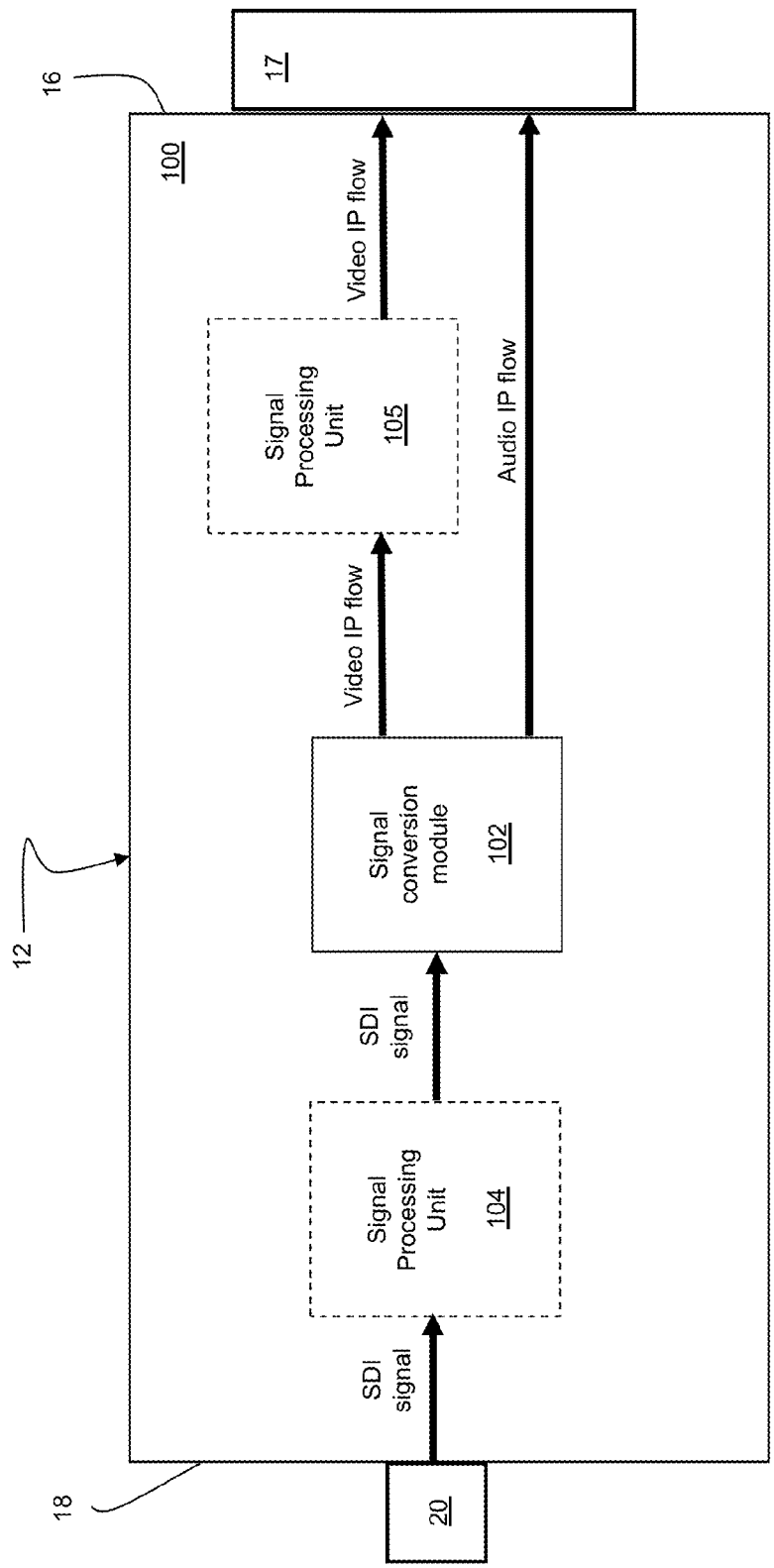

In another particular aspect illustrated in FIG. 7D, the SFP unit 100 comprises at least one signal processing unit. For example, the SFP unit 100 comprises a signal processing unit 104 for processing the SDI signal received by the SDI connector 20, before the SDI signal is processed by the signal conversion module 102. The signal processing unit 104 may provide at least one of the following functionalities: SDI signal re-clocking, SDI signal reshaping or reconditioning, etc. In a particular embodiment, the signal processing unit 104 is integrated to the signal conversion module 102.

Alternatively or complementarity, the SFP unit 100 comprises a signal processing unit 105 for processing the payload of at least one of the IP flows generated by the signal conversion module 102. For example, FIG. 7D illustrates the processing of the video payload of the video IP flow by the signal processing unit 105. In a particular embodiment, the signal processing unit 105 compresses the payload of at least one of the IP flows (e.g. video IP flow as illustrated in FIG. 7D) generated by the signal conversion module 102. In another particular embodiment, the signal processing unit 105 is integrated to the signal conversion module 102.

In still another particular aspect, the IP flows generated by the signal conversion module 102 are either unicast or multicast IP flows. A combination of unicast and multicast IP flows can be generated simultaneously. For example, referring to FIG. 7A, the video IP flow may be a multicast IP flow, while the audio IP flow is a unicast IP flow. In the case of a multicast IP flow, the signal conversion module 102 may only generate IP packets compliant with the IP multicast standard, and the joining/leaving of a corresponding multicast group is performed by a dedicated equipment (e.g. a router not represented in the Figures, or the video processing server 150/audio processing server 160). Alternatively, the SFP unit 100 also supports the functionality of managing the joining/leaving of the corresponding multicast group.

Figure 8:
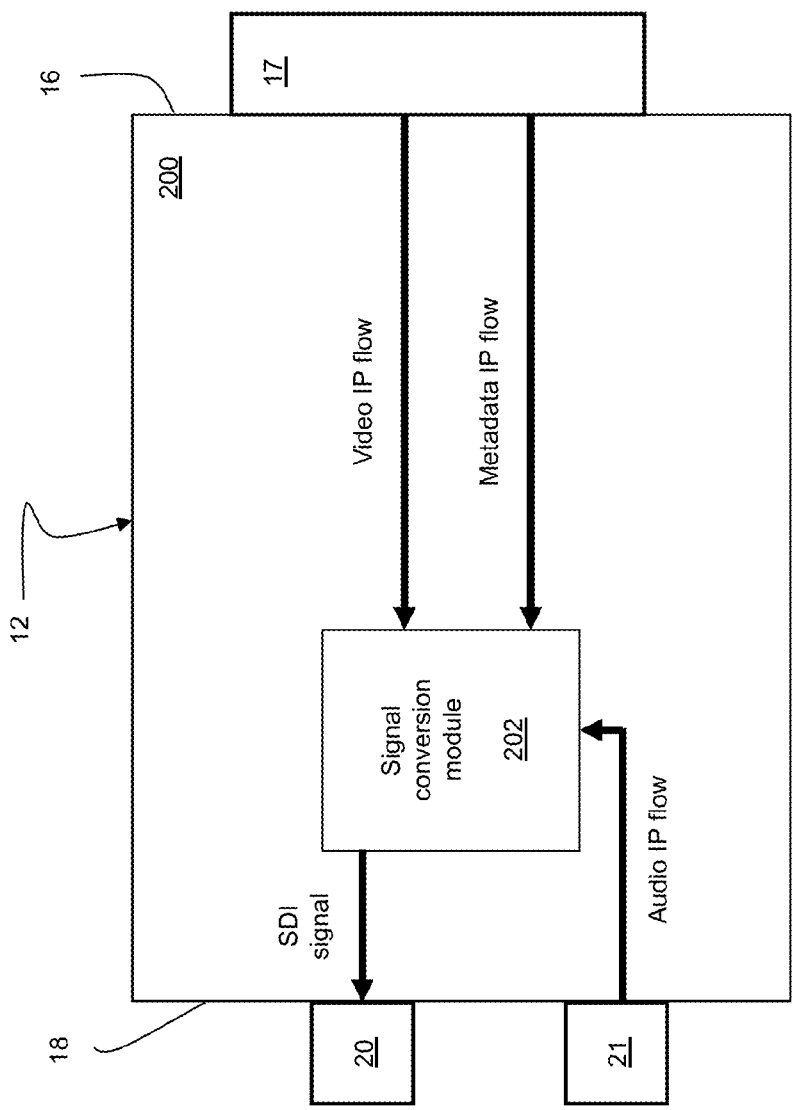
FIGS. 8 represents a simplified exemplary block diagram of an SFP unit having a signal conversion module for combining a payload of two or more IP flows into a SDI signal.

Referring now to FIG. 8, an exemplary block diagram of an SFP unit 200 having IP flows to SDI signal conversion capabilities is illustrated. The SFP unit 200 corresponds to the SFP unit 10 represented in FIGS. 1-6, and has been adapted to provide the signal conversion capabilities via a signal conversion module 202 internal to the housing 12 of the SFP unit 200. The signal conversion unit 202 represented in FIG. 8 is similar to the signal conversion units 102 represented in FIGS. 7A, 7B, 7C and 7D; except that it performs a complementary conversion (IP flows to SDI signal in place of SDI signal to IP flow).

The signal conversion module 202 combines a video payload transported by a first IP flow with at least one other payload transported by at least one other IP flow into a SDI signal. The SFP unit 200 comprises an SDI connector 20 on its front panel 18 for outputting the SDI signal generated by the signal conversion module 202. The first IP flow and the at least one other IP flow are received by one or more connectors of the SFP unit 200 different from the SDI connector 20. In a particular aspect, the signal conversion module 202 combines the video payload transported by the first IP flow and the at least one other payload transported by the at least one other IP flow based on time codes provided in both the first IP flow and the at least one other IP flow.

FIG. 8 illustrates the signal conversion module 202 combining a video IP flow transporting a video payload, an audio IP flow transporting an audio payload, and a metadata IP flow for transporting a metadata payload into the SDI signal. Thus, the SDI signal comprises a video payload, an audio payload, and a metadata payload.

Although not represented in the Figures, the signal conversion module 202 may only combine a video IP flow transporting a video payload and an audio IP flow transporting an audio payload. Thus, the SDI signal comprises a video payload and an audio payload only. Similarly, the signal conversion module 202 may only combine a video IP flow transporting a video payload and a metadata IP flow transporting a metadata payload. Thus, the SDI signal comprises a video payload and a metadata payload only.

The IP flows processed by the signal conversion module 202 may be received by different connectors of the SFP unit 200. For example, FIG. 8 illustrates the video IP flow and the metadata IP flow being received by the rear interface 17 on the back panel 16, and the audio IP flow being received by a second connector 21 on the front panel 18. FIG. 8 is for illustration purposes only, and other combinations of IP flows received by the rear interface 17 and the connector 21 can also be implemented by the SFP unit 200.

Alternatively, the IP flows processed by the signal conversion module 202 are all received by a same connector of the SFP unit 200. For example, all the IP flows can be received by the rear interface 17 on the back panel 16, or by the second connector 21 on the front panel 18. This embodiment is not represented in the Figures.

As mentioned previously with respect to the SFP unit 100 of FIG. 7A, the connector 21 for receiving the IP flow(s) may consist of an electrical or optical connector, adapted for receiving a signal transporting the IP flow(s) from respectively an electrical or optical cable connected to the SFP unit 200 via the connector 21.

As mentioned previously with respect to the SFP unit 100 of FIG. 7A, the IP flows received by the SFP unit 200 can be transmitted by different servers (not represented in FIG. 8) via an IP network infrastructure. For example, the IP flow transporting the video payload is transmitted by a video processing server dedicated to the generation/processing of video payloads (similar to the video processing server 150 represented in FIG. 7A), and the IP flow transporting the audio payload is transmitted by an audio processing server dedicated to the generation/processing of audio payloads (similar to the audio processing server 160 represented in FIG. 7A). The IP flow transporting the metadata payload can also be transmitted by a metadata processing server dedicated to the generation/processing of metadata payloads.

In a particular aspect, at least one of the IP flows (received by a connector (e.g. 17 or 21) of the SFP unit 200 and processed by the signal conversion module 202) conforms to one of the following standards: the SMPTE 2022-5 standard, the SMPTE 2022-6 standard, and the SMPTE 2022-7 standard. These three standards can be used singly or in combination.

In another particular aspect not illustrated in FIG. 8, the SFP unit 200 comprises at least one signal processing unit. For example, the SFP unit 200 comprises a signal processing unit (similar to the signal processing unit 104 represented in FIG. 7D) for processing the SDI signal generated by the signal conversion module 202, before transmission via the SDI connector 20. In a particular embodiment, the signal processing unit is integrated to the signal conversion module 202.

Alternatively or complementary, the SFP unit 200 comprises a signal processing unit (similar to the signal processing unit 105 represented in FIG. 7D) for processing the payload of at least one of the IP flows received by the SFP unit 200, before further processing by the signal conversion module 202. In a particular embodiment, the signal processing unit decompresses the payload of at least one of the IP flows (e.g. video IP flow). The payload has been compressed by an equipment generating/transmitting the IP flow (e.g. a video processing server similar to the one (150) represented in FIG. 7A). In another particular embodiment, the signal processing unit is integrated to the signal conversion module 202.

In still another particular aspect, the IP flows received by the SFP unit 200 are either unicast or multicast IP flows. A combination of unicast and multicast IP flows can be received simultaneously. For example, the video IP flow may be a multicast IP flow, while the audio IP flow and the metadata IP flow are unicast IP flows. In the case of a multicast IP flow, the signal conversion module 202 may only process IP packets compliant with the IP multicast standard, and the joining/leaving of a corresponding multicast group is performed by another equipment. Alternatively, the SFP unit 200 also supports the functionality of managing the joining/leaving of the corresponding multicast group.

In yet another particular aspect, the SFP unit 200 also includes the SDI signal to IP flows conversion capabilities of the SFP unit 100 represented in FIG. 7A. In a first embodiment, a second signal conversion module (similar to the signal conversion module 102 represented in FIG. 7A) operates in parallel with the signal conversion module 202, for providing the SDI signal to IP flows conversion capabilities. In a second embodiment, the signal conversion module 202 also provides the SDI signal to IP flows conversion capabilities. In this configuration, the connectors 20, 21 and 17 can be transceivers (the SDI connector is capable of receiving and transmitting SDI signals, the connector 21 and rear interface 17 are capable of receiving and transmitting IP flows).

Referring now to FIGS. 7A and 8, a specific use case is illustrated. A first SFP unit 100 represented in FIG. 7A is used for converting an original SDI signal into a plurality of IP flows having each a particular payload (e.g. video payload and metadata payload) extracted from the original SDI signal by the SFP unit 100. The IP flows are transmitted by the SFP unit 100 to dedicated servers, respectively capable of processing the several particular payloads (e.g. video payload and metadata payload). The processed payloads are transmitted to a second SFP unit 200 represented in FIG. 8 via several IP flows. The second SFP unit 200 recombines the processed payloads transported by the several the IP flows into a SDI signal, which can then be transmitted by the SFP unit 200 to one or more display equipment.

Figure 9:
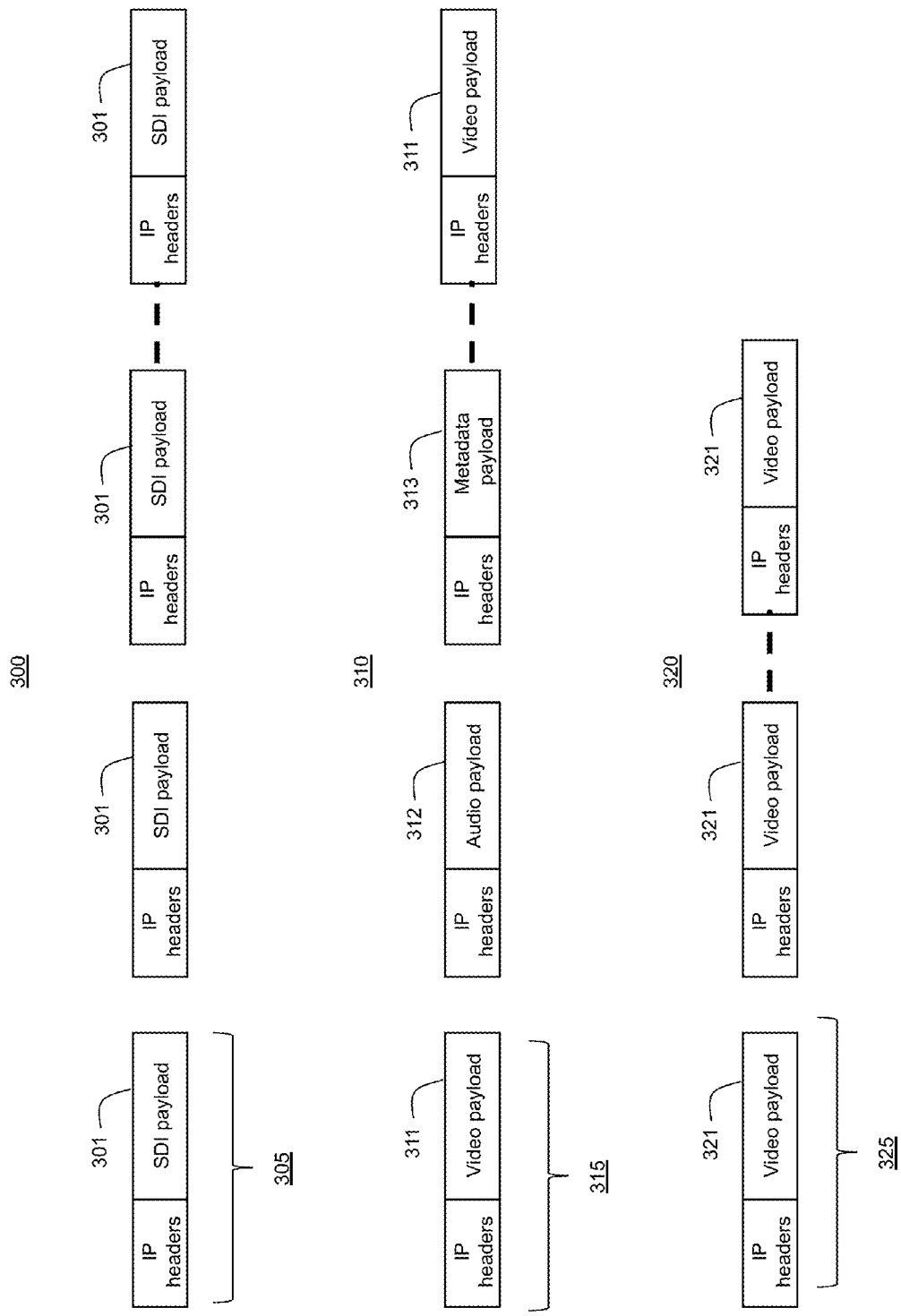
FIG. 9 illustrates the transport of an SDI payload in IP packets according to various embodiments.

Referring now to FIG. 9, the transport of an SDI payload in IP packets according to various embodiments is illustrated.

In a traditional embodiment, a single IP flow 300 transports the original SDI payload (not represented in FIG. 9) of a SDI signal. The original SDI payload contains a video payload, and at least one of an audio payload and a metadata payload. The original SDI payload is simply divided into SDI payload chunks 301 transported by IP packets 305. Thus, each SDI payload chunk 301 transported by an IP packet 305 may contain a combination of the video payload and at least one of the audio payload and the metadata payload. Some of the IP packets 305 may contain a smaller SDI payload chunk 301 and some padding, for marking a frame boundary of the original SDI payload.

In another embodiment, a single IP flow 310 transports the original SDI payload (not represented in FIG. 9) of a SDI signal. The original SDI payload contains a video payload, and at least one of an audio payload and a metadata payload. The original SDI payload is processed, to be divided into independent video payload chunks 311, audio payload chunks 312 and metadata payload chunks 313, transported by IP packets 315. The processing of the original SDI payload comprises identifying and extracting the independent video payload chunks 311, audio payload chunks 312 and metadata payload chunks 313. Thus, each IP packet 315 of the IP flow 310 contains only one of a video payload chunk 311, an audio payload chunk 312, and a metadata payload chunk 313. For a single frame of the original SDI payload, the IP flow 310 comprises a plurality of IP packets 315 for transporting the video payload chunks 311, as well as one or a few packets for transporting the audio payload chunks 312 and the metadata payload chunks 313 respectively. Some of the IP packets 315 may also contain some padding, for marking a frame boundary of the original SDI payload, as well as audio and metadata boundaries. This embodiment has not been described previously in relation to FIGS. 7A-7D and 8. However, the signal conversion module 102 of the SFP unit 100 represented in FIG. 7A may generate the IP flow 310 based on the original SDI payload of the received SDI signal. Similarly, the signal conversion module 202 of the SFP unit 200 represented in FIG. 8 may generate the SDI signal comprising the original SDI payload based on the received IP flow 310.

In still another embodiment, a plurality of IP flows transport the original SDI payload (not represented in FIG. 9) of a SDI signal. The original SDI payload contains a video payload, and at least one of an audio payload and a metadata payload. The original SDI payload is processed, to be divided into independent video payload chunks 321, audio payload chunks (not represented in FIG. 9) and metadata payload chunks (not represented in FIG. 9), transported by IP packets. The processing of the original SDI payload comprises identifying and extracting the independent video payload chunks 321, audio payload chunks and metadata payload chunks. The video payload chunks 321, audio payload chunks and metadata payload chunks are respectively transported by IP packets of independent IP flows. FIG. 9 only represents an IP flow 320 for transporting the video payload chunks 321 into IP packets 325. However, similar IP flows dedicated to the transport of the audio payload chunks and the metadata payload chunks respectively may have been represented as well. This embodiment has been described previously in relation to FIGS. 7A-7D and 8, and is implemented by the signal conversion module 102 of the SFP unit 100 represented in FIG. 7A. The signal conversion module 202 of the SFP unit 200 represented in FIG. 8 is used to recombine the independent IP flows into the SDI signal comprising the original SDI payload.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A standardized hot-pluggable transceiving unit comprising:
   a housing having specific standardized dimensions and adapted to being inserted into a chassis of a hosting unit;
   a Serial Digital Interface (SDI) connector for receiving a SDI signal comprising a video payload and another payload; and
   a signal conversion module in the housing for converting the SDI signal into a first Internet Protocol (IP) flow for transporting the video payload and a second IP flow for transporting the other payload.

2. The standardized hot-pluggable transceiving unit of claim 1, further comprising a second connector for outputting the first and second IP flows.

3. The standardized hot-pluggable transceiving unit of claim 1, further comprising a second connector for outputting the first IP flow and a third connector for outputting the second IP flow.

4. The standardized hot-pluggable transceiving unit of claim 1, wherein the other payload consists of an audio payload.

5. The standardized hot-pluggable transceiving unit of claim 1, wherein the other payload consists of a metadata payload.

6. The standardized hot-pluggable transceiving unit of claim 5, wherein the metadata payload comprises at least one of the following: closed caption text, subtitle text, rating text, a time code, a Vertical Blanking Interval (VBI), and a V-chip rating.

7. The standardized hot-pluggable transceiving unit of claim 5, wherein the SDI signal further comprises an audio payload, and the signal conversion module converts the SDI signal into a third Internet Protocol (IP) flow for transporting the audio payload.

8. The standardized hot-pluggable transceiving unit of claim 1, wherein at least one of the first and second IP flows conforms to one of the following standards: the SMPTE 2022-5 standard, the SMPTE 2022-6 standard, and the SMPTE 2022-7 standard.

9. The standardized hot-pluggable transceiving unit of claim 1, further comprising at least one signal processing unit for processing at least one of the following: the SDI signal, the video payload of the first IP flow, and the other payload of the second IP flow.

10. The standardized hot-pluggable transceiving unit of claim 9, wherein the at least one signal processing unit compresses at least one of the video payload of the first IP flow and the other payload of the second IP flow.

11. A standardized hot-pluggable transceiving unit comprising:
- a housing having specific standardized dimensions and adapted to being inserted into a chassis of a hosting unit;
- a signal conversion module in the housing for combining a video payload transported by a first IP flow with another payload transported by a second IP flow into a SDI signal, the first and second IP flows being received by the transceiving unit; and
- a SDI connector for outputting the SDI signal.

12. The standardized hot-pluggable transceiving unit of claim 11, further comprising a second connector for receiving the first and second IP flows.

13. The standardized hot-pluggable transceiving unit of claim 11, further comprising a second connector for receiving the first IP flow and a third connector for receiving the second IP flow.

14. The standardized hot-pluggable transceiving unit of claim 11, wherein the other payload consists of an audio payload.

15. The standardized hot-pluggable transceiving unit of claim 11, wherein the other payload consists of a metadata payload.

16. The standardized hot-pluggable transceiving unit of claim 15, wherein the metadata payload comprises at least one of the following: closed caption text, subtitle text, rating text, a time code, a Vertical Blanking Interval (VBI), and a V-chip rating.

17. The standardized hot-pluggable transceiving unit of claim 15, wherein the signal conversion module further combines an audio payload transported by a third IP flow with the video payload and the metadata payload into the SDI signal, the third IP flow being received by the transceiving unit.

18. The standardized hot-pluggable transceiving unit of claim 11, wherein at least one of the first and second IP flows conforms to one of the following standards: the SMPTE 2022-5 standard, the SMPTE 2022-6 standard, and the SMPTE 2022-7 standard.

19. The standardized hot-pluggable transceiving unit of claim 11, further comprising at least one signal processing unit for processing at least one of the following: the SDI signal, the video payload of the first IP flow, and the other payload of the second IP flow.

20. The standardized hot-pluggable transceiving unit of claim 19, wherein the at least one signal processing unit decompresses at least one of the video payload of the first IP flow and the other payload of the second IP flow.

* * * * *